United States Patent
Shimada et al.

(10) Patent No.: US 11,131,051 B2
(45) Date of Patent: Sep. 28, 2021

(54) WASHING MACHINE AND PULLEY FOR WASHING MACHINE

(71) Applicant: Samsung Electronics Co., Ltd., Suwon-si (KR)

(72) Inventors: Yoshinari Shimada, Yokohama (JP); Kazushi Mori, Yokohama (JP); Takahiro Nakashima, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 184 days.

(21) Appl. No.: 15/775,976

(22) PCT Filed: Nov. 11, 2016

(86) PCT No.: PCT/KR2016/013005
§ 371 (c)(1),
(2) Date: May 14, 2018

(87) PCT Pub. No.: WO2017/082674
PCT Pub. Date: May 18, 2017

(65) Prior Publication Data
US 2018/0327955 A1    Nov. 15, 2018

(30) Foreign Application Priority Data
Nov. 13, 2015    (JP) .............................. JP2015-223243

(51) Int. Cl.
*D06F 37/22*    (2006.01)
*F16H 55/36*    (2006.01)
(Continued)

(52) U.S. Cl.
CPC ............ *D06F 37/206* (2013.01); *D06F 37/04* (2013.01); *D06F 37/30* (2013.01); *F16H 7/02* (2013.01);
(Continued)

(58) Field of Classification Search
CPC ............ F16H 55/36; F16H 55/40; F16H 55/48
See application file for complete search history.

(56) References Cited

U.S. PATENT DOCUMENTS 1,451,770 A * 4/1923 Hu ........................ F16H 55/40
474/195
5,735,006 A * 4/1998 Vande Haar .......... D06F 37/225
68/23.2
(Continued)

FOREIGN PATENT DOCUMENTS

EP    1431439 A1    6/2004
EP    2159314 A1 *  3/2010 ............. F16H 55/48
(Continued)

OTHER PUBLICATIONS

ISA/KR, "International Search Report and Written Opinion of the International Searching Authority," International Application No. PCT/KR2016/013005, dated Feb. 2, 2017, 12 pages.

*Primary Examiner* — Marc Lorenzi

(57) ABSTRACT

By improving the rigidity of a pulley while suppressing a weight of the pulley from increasing, excessive noises due to resonance can be reduced. A washing machine 1 includes a drum 9 rotatably disposed in the water tub 5. The washing machine 1 has a motor to rotationally drive a pulley 20, which is fixed to the drum 9, via an endless belt 13. The pulley 20 has a plurality of arms 23 radially extend from the boss 22 to support an outer wheel 21. The arm 23 has a variable cross-sectional portion 24 in which a section modulus against bending in an axial direction gradually decreases from the boss 22 to the outer wheel 21.

12 Claims, 14 Drawing Sheets

(51) Int. Cl.
  *F16H 55/40*  (2006.01)
  *D06F 37/20*  (2006.01)
  *D06F 37/04*  (2006.01)
  *D06F 37/30*  (2020.01)
  *F16H 7/02*   (2006.01)
  *D06F 58/08*  (2006.01)
  *D06F 37/36*  (2006.01)

(52) U.S. Cl.
  CPC ............ *F16H 55/36* (2013.01); *D06F 37/22* (2013.01); *D06F 37/36* (2013.01); *D06F 58/08* (2013.01); *F16H 2055/366* (2013.01)

(56) References Cited

U.S. PATENT DOCUMENTS

| | | | |
|---|---|---|---|
| 2007/0245776 A1* | 10/2007 | Reinwald | D06F 37/26 68/212 |
| 2014/0221140 A1* | 8/2014 | Garlatti | F16H 55/48 474/190 |
| 2016/0290472 A1* | 10/2016 | Manzoor | F16H 55/40 |

FOREIGN PATENT DOCUMENTS

| | | | | |
|---|---|---|---|---|
| GB | 2412711 A | * | 10/2005 | ............ F16H 55/48 |
| JP | 2004138209 A | | 5/2004 | |
| JP | 2005169149 A | | 6/2005 | |
| KR | 10-2007-0063997 A | | 6/2007 | |
| KR | 10-2014-0064934 A | | 5/2014 | |

* cited by examiner

[Fig. 1]
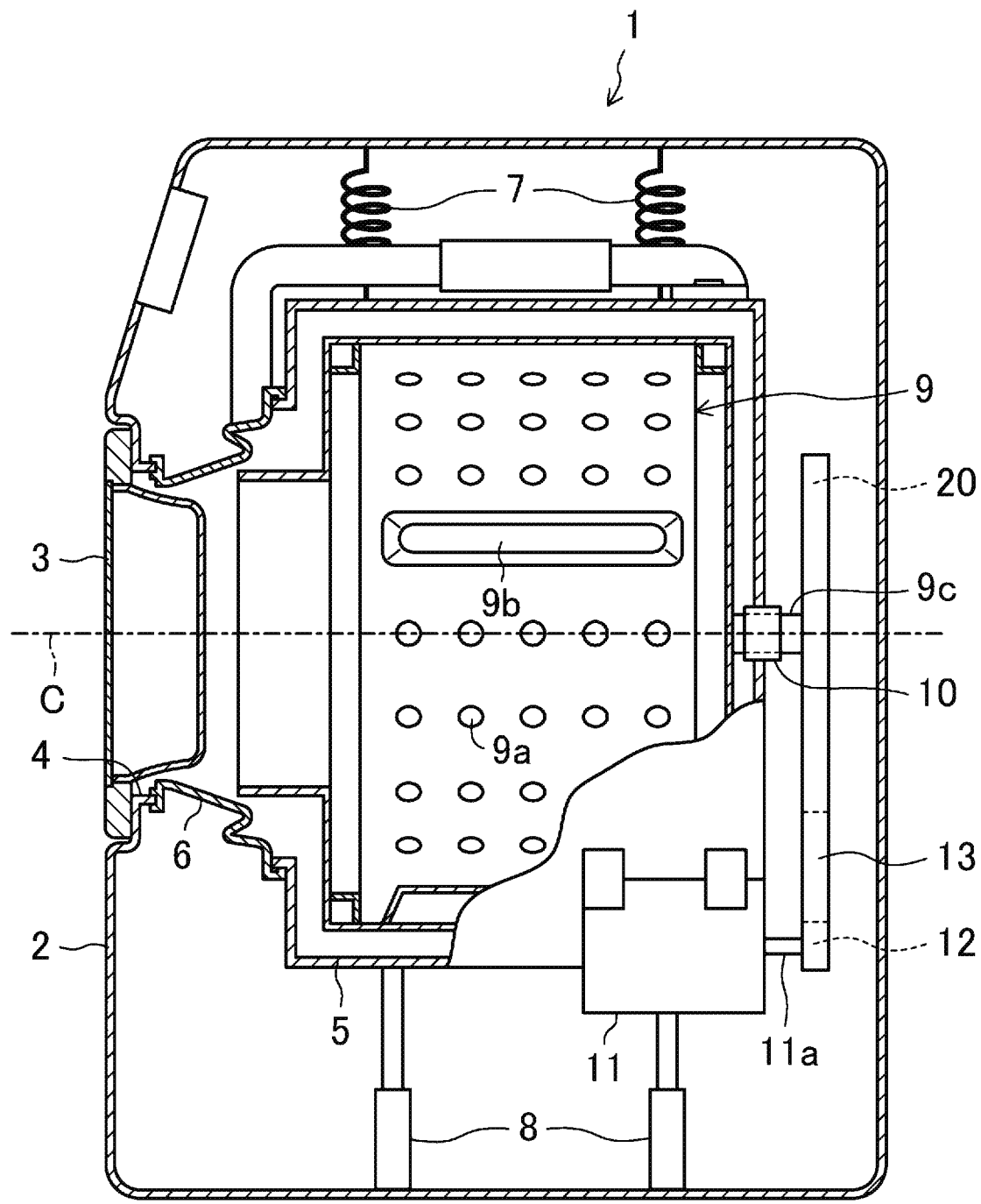

[Fig. 2]
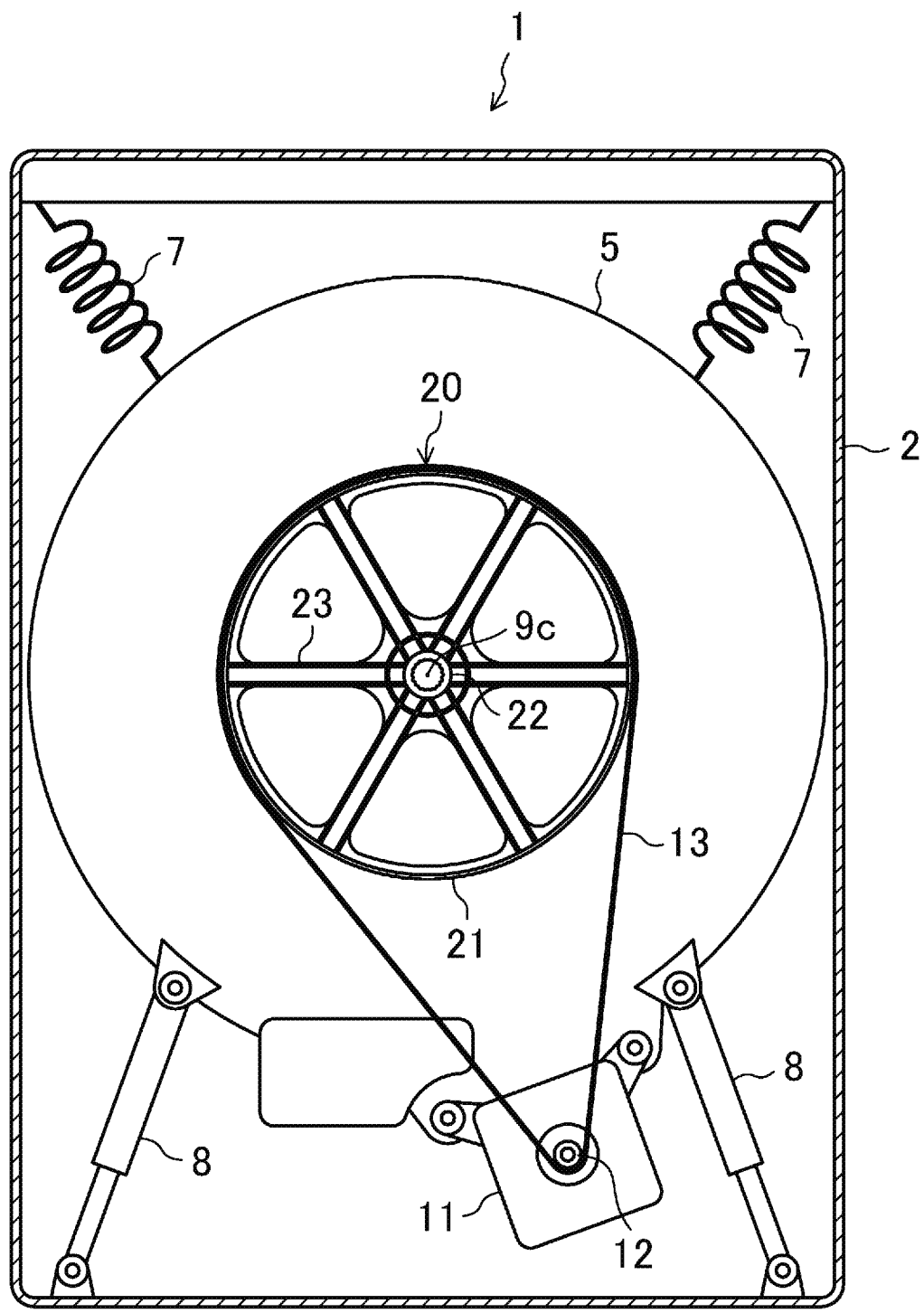

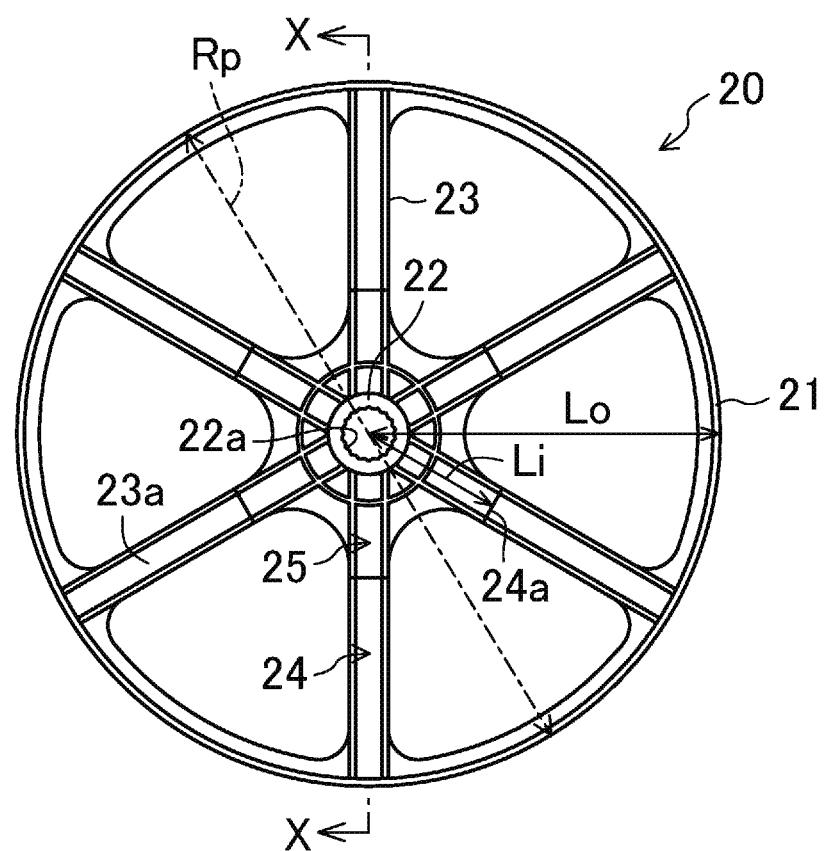
[Fig. 3a]

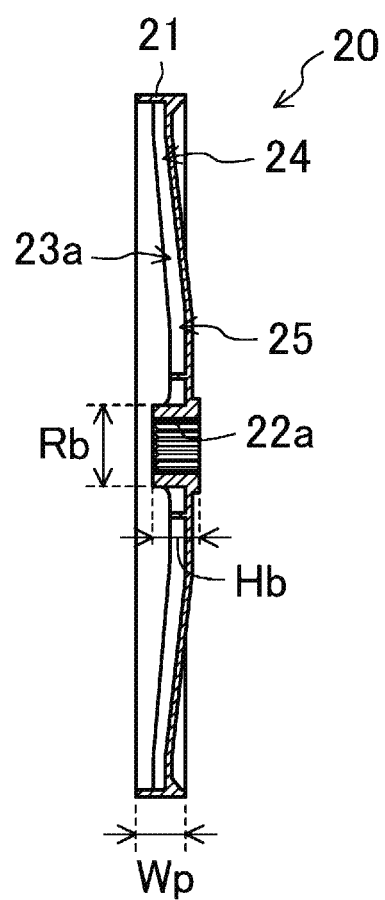
[Fig. 3b]

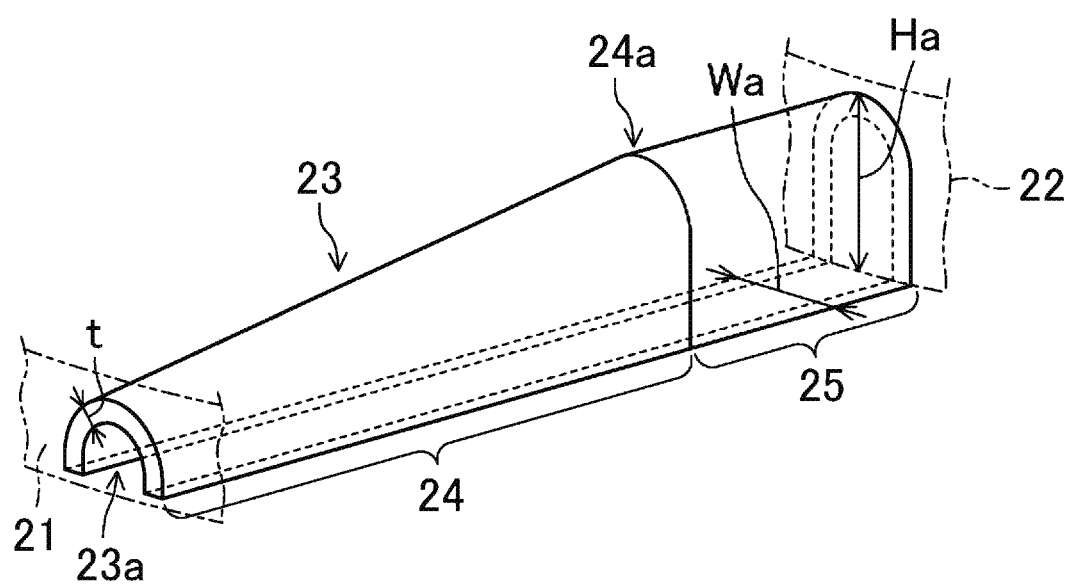
[Fig. 4]

[Fig. 5]
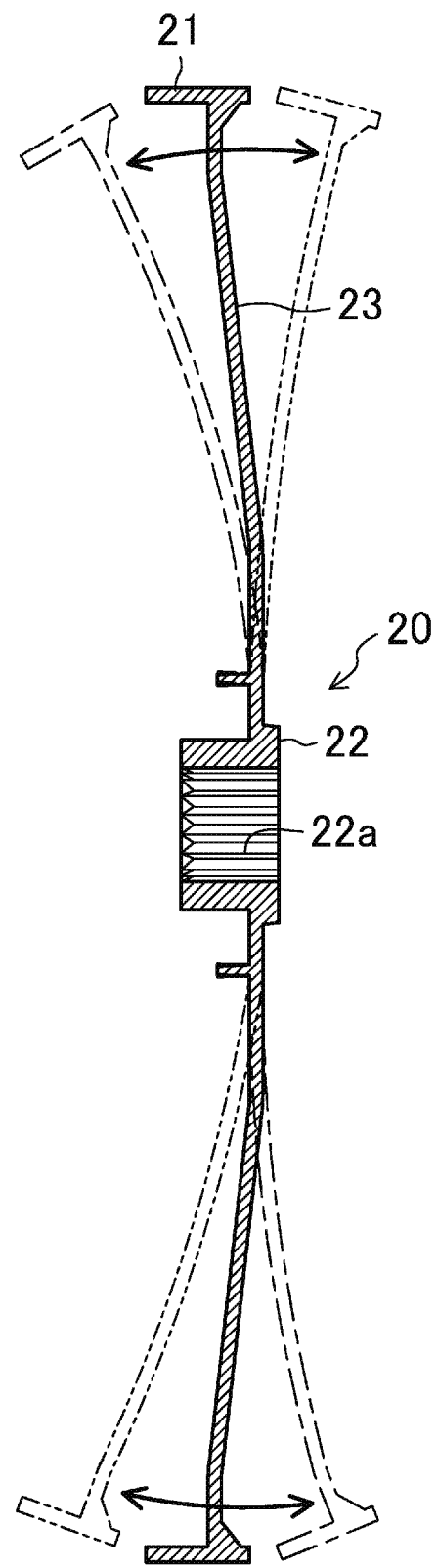

[Fig. 6]
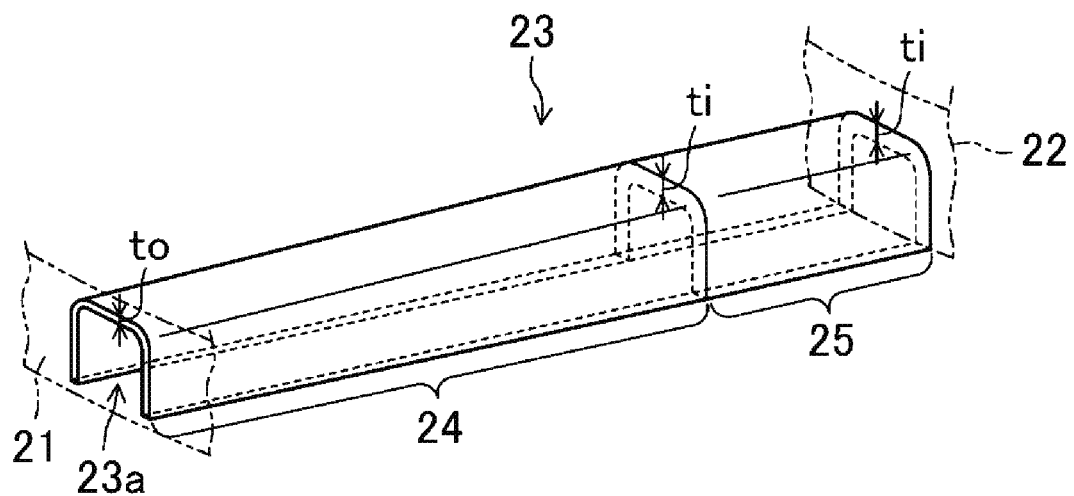

[Fig. 7a]
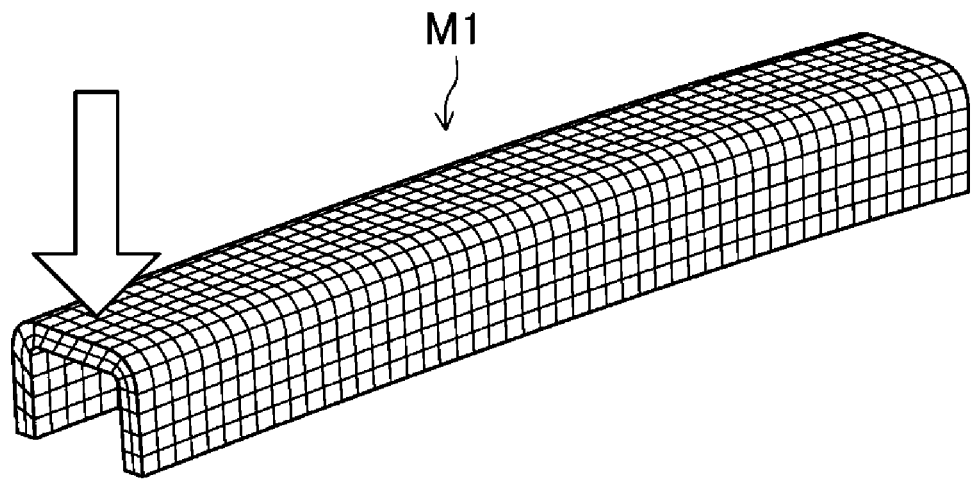
PRIOR ART

[Fig. 7b]
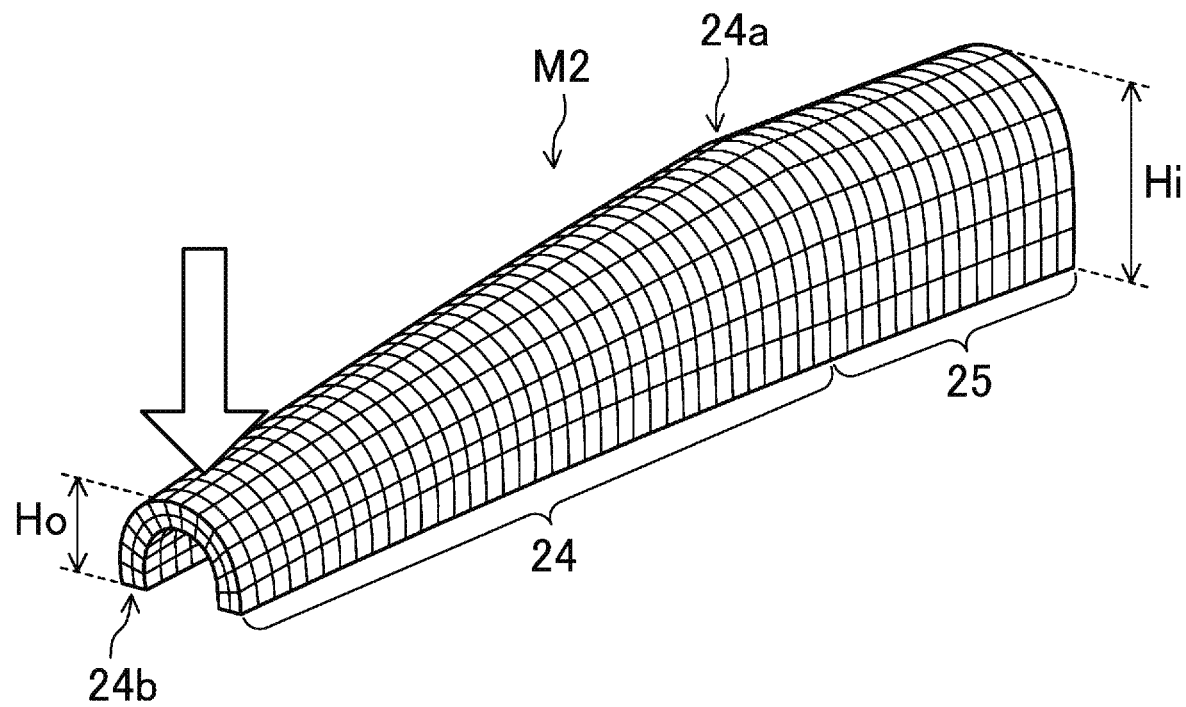

[Fig. 8]
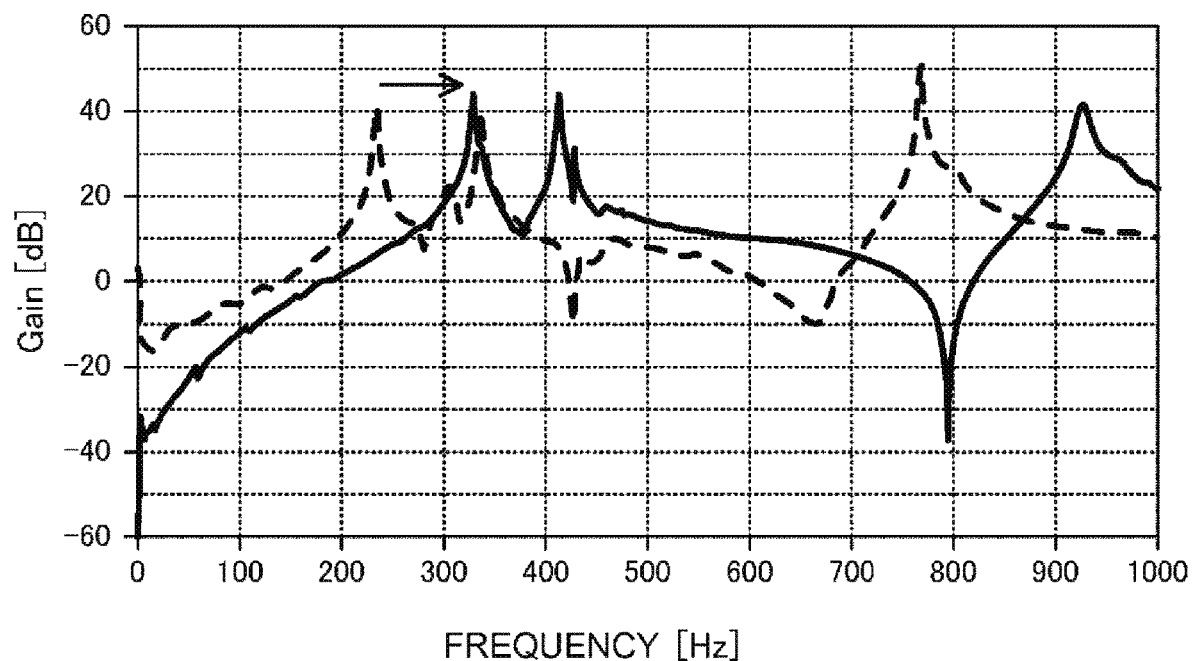

[Fig. 9]
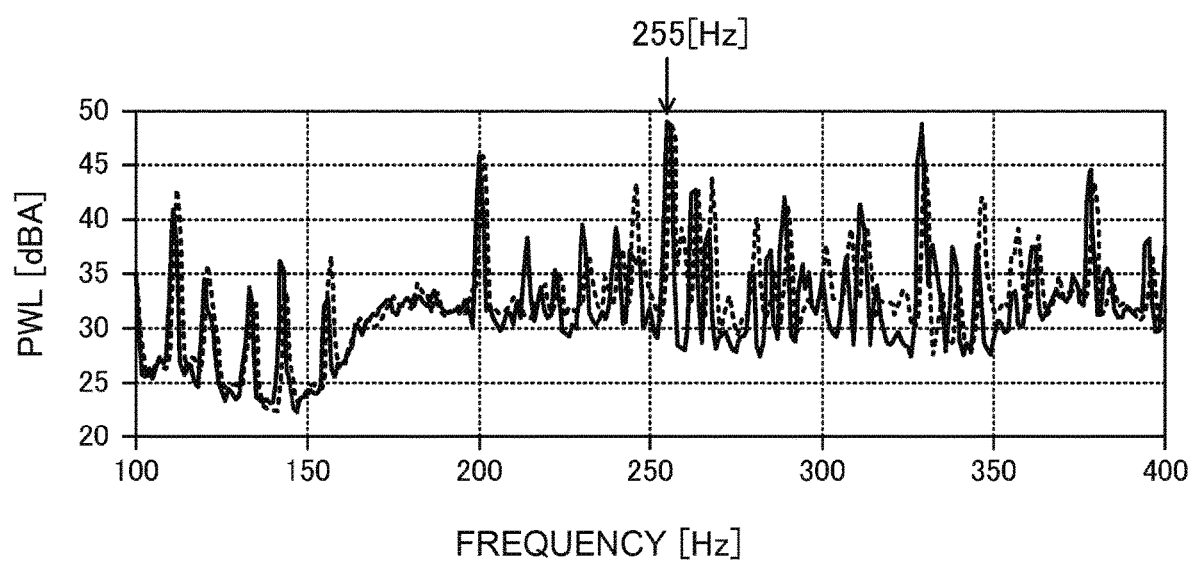

[Fig. 10]
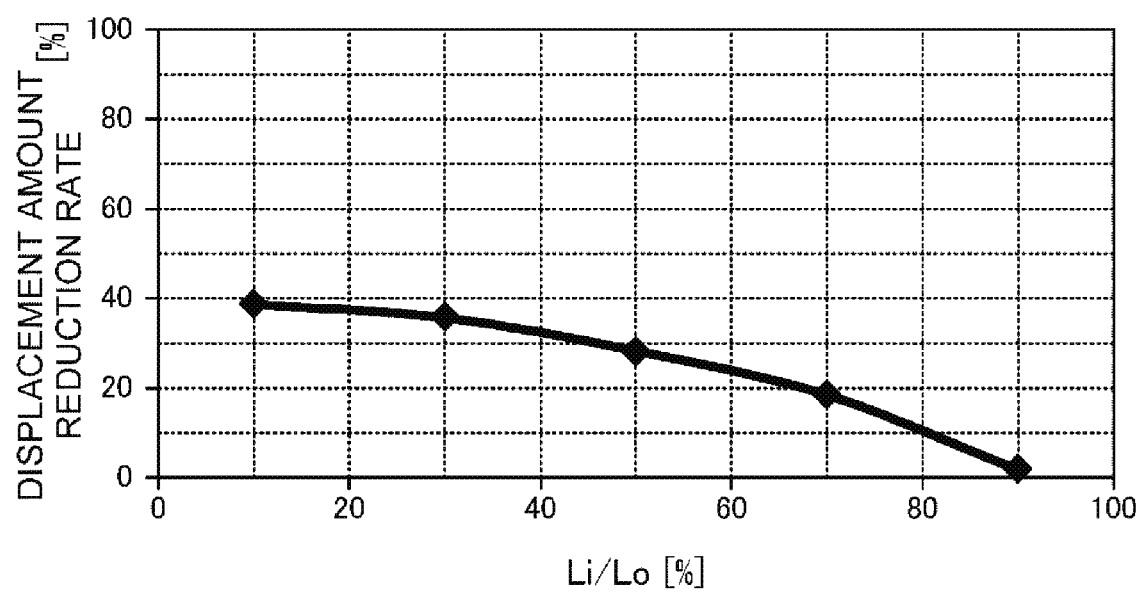

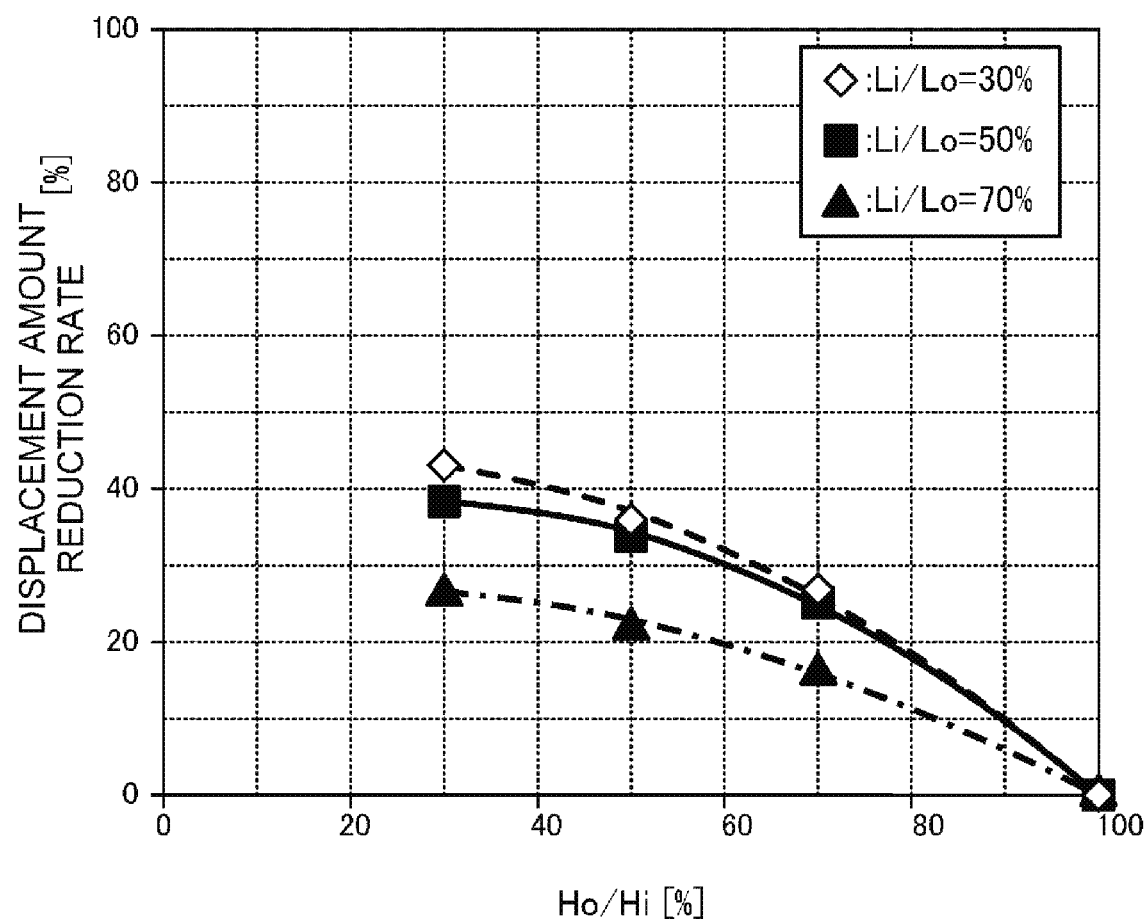
[Fig. 11]

[Fig. 12]
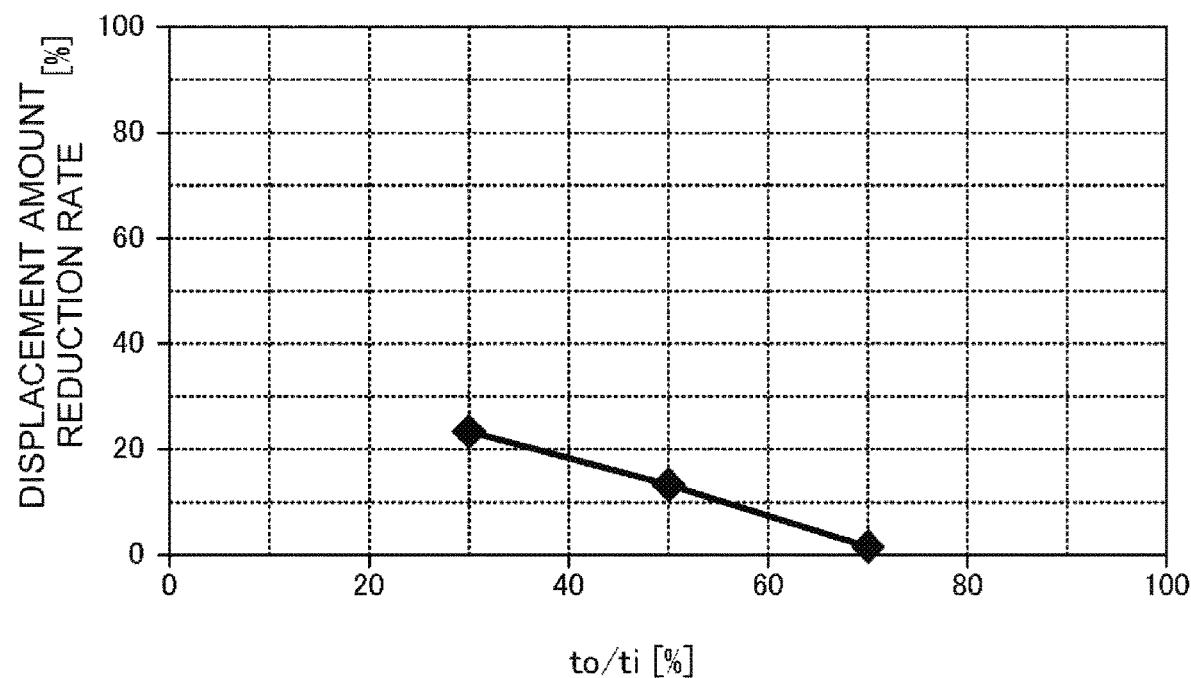

WASHING MACHINE AND PULLEY FOR WASHING MACHINE

CROSS-REFERENCE TO RELATED APPLICATIONS AND CLAIM OF PRIORITY

This application is a 371 National Stage of International Application No. PCT/KR2016/013005 filed Nov. 11, 2016, which claims priority to Japanese Patent Application No. 2015-223243 filed Nov. 13, 2015, the disclosures of which are herein incorporated by reference in their entirety.

BACKGROUND

1. Field

The present invention relates to a technology for suppressing noises and vibrations generated from a pulley directly mounted on a drum.

2. Related Art

As a pulley directly mounted on a drum, a pulley having a shape in which a plurality of arms radially extend from a boss at a center to support an outer wheel, is, for example, disclosed in European Patent Application Publication specification (EP0823503A2). However, the arms of the pulley form a shape of a band plate having a constant thickness in an axial direction.

Further, a pulley configured to prevent vibrations and noises of a washing machine is disclosed in Japanese Laid-Open Patent Publication No. 11-114282. However, the pulley includes an inner pulley of a disk shape having a shaft hole at a center thereof, an outer pulley having an annular plate shape and disposed around the inner pulley, and a vibration absorption member such as rubber inserted into a gap between the inner pulley and the outer pulley, and the vibration absorption member damps and absorbs vibrations transferred to the pulley.

SUMMARY

In most washing machines, a drum having a plurality of dehydration holes in an outer circumferential surface thereof is rotatably accommodated in the inside of a water tub. Although a drum is controlled to rotate at low speed during washing or rinsing, since a large amount of water is left in the drum, the drum needs to be driven with high torque, and although the drum is drained during dehydration and thus may be driven with low torque, since the drum is driven by a centrifugal force, the drum needs to be rotationally driven at high speed.

That is, a motor configured to rotationally drive a drum requires specific power performance from low speed high torque to high speed low torque. Accordingly, to appropriately rotationally drive the drum under the above-described conditions, a shaft of the drum needs to be connected to a driving shaft of the motor which is a power source at a large speed change ratio, but recently, a direct drive method, which is a method of directly driving a drum without complicated transmission devices, is becoming common.

Among the washing machines, in a type in which a pulley is fixed to a shaft of the drum and rotationally driven by a motor through an endless belt, a pulley having a large external diameter is used for the necessity of obtaining high torque. Accordingly, the motor is controlled to rotate at high speed during dehydration.

Since vibrations generated from the motor are transferred to the pulley, the drum, and further, a case of the washing machine through the endless belt, relatively large noises are generated due to the vibrations from the motor during the dehydration in which the motor rotates at high speed. At this time, in a case of the above-described pulley, since a resonance frequency of the pulley has a value close to a value of a rotation frequency of the motor during the dehydration, amplitudes of the vibrations transferred to the pulley are amplified, and thus noises increase.

Like a pulley disclosed in Japanese Laid-Open Patent Publication No. 11-114282, when a vibration absorption member is mounted on the pulley, vibrations transferred to a drum may be reduced, however, when the vibration absorption member is separately mounted, new problems such as an increase of costs for a member, lowered rigidity and durability of the pulley, and the like occur.

Although the vibration absorption member is not mounted on the pulley, when rigidity of the pulley is increased, and thus the resonance frequency of the pulley has a value significantly different from a value of the rotation frequency of the motor during the dehydration, noises may be suppressed from increasing.

However, when widths or thicknesses of arms are increased to increase the rigidity of the pulley, since a weight of the pulley increases, and thus the costs for a member increase, the advantage is hindered.

Therefore, it is an aspect of the present invention to provide a washing machine configured to improve the rigidity of a pulley while avoiding an increase of a weight of the pulley to reduce noises due to resonance.

The present invention relates to a washing machine in which a drum is rotatably housed inside a water tub.

The washing machine includes a pulley mounted on a shaft of the drum, and a motor for rotating the pulley through an endless belt. The pulley has an outer ring of a circular ring type on which the endless belt is wound on the outer periphery, a boss which is located at the center of the outer ring and on which the shaft is fixed, and a plurality of arms extending radially from the boss and supporting the outer ring. A variable cross-sectional portion is formed at at least a portion of the arm adjacent to the outer ring so that a section modulus for the bending in the axial direction gradually decreases from the boss toward the outer ring.

That is, the washing machine is a belt driving type, and the pulley of the drum is rotationally driven by a motor through an endless belt. The outer ring of the pulley on which the endless belt is wound is supported by a plurality of arms extending radially from the boss, and a variable cross-sectional portion is formed in the outer ring side portion of these arms so that the section modulus against the bending in the axial direction gradually decreases from the boss toward the outer ring.

In the case of a pulley of such a shape, since a high rigidity is obtained at the outer ring and its peripheral portion thereof and it is structured to support it by a plurality of arms, in many cases, the first resonance is a state in which each arm is deformed to be deflected in the axial direction while maintaining the shape of the outer ring. In this case, relatively high bending stress acts on the boss-side portion of each arm.

The structure of the arm was analyzed by the element analysis method (FEM), and it was found that the axial stiffness of the entire arm could be improved by forming the variable cross-sectional portion on the outer ring side of the arm, for example, even when the weight of the arm is intact. Therefore, by forming variable cross-sectional portion in each arm, deformation of the arm may be effectively suppressed while suppressing the weight increase of the pulley, and it becomes possible to increase the resonance frequency in the first resonance mode. As a result, it is possible to design the primary resonance frequency far away from the frequency of the excitation source of the motor, while suppressing the increase in the weight of the pulley, thereby reducing the noise caused by the vibration of the pulley and allowing the user to use the washing machine comfortably.

For example, The section modulus may be set by gradually decreasing the height in the axial direction of the arm so that the height of the outer ring-side end portion of the variable cross-sectional portion is 30% or more and 70% or less of the height of the boss-side end portion of the variable cross-sectional portion.

Thus, since the bending stiffness of the arm is effectively strengthened, the increase in noise due to the resonance may be more stably suppressed.

In this case, a constant cross-sectional portion having a constant section modulus may be formed at a portion between the boss-side end portion of the variable cross-sectional portion of the arm and the boss, and the length from the center of the shaft portion to the boss-side end portion may be set to be 80% or less of the length from the center of the shaft portion to the outer edge of the outer ring.

Thus, since the boss-side portion of the arm that requires higher flexural rigidity may be made more difficult to bend, the bending stiffness of the arm may be more effectively strengthened.

The section modulus may also be set by gradually reducing the thickness of the arm so that the thickness of the outer ring-side end portion is 30% or more and 50% or less of the thickness of the boss-side end portion.

Also in this case, since the flexural rigidity of the arm is strengthened similarly to the case of changing the height in the axial direction, the increase in noise due to the resonance may be stably suppressed.

Particularly, it is preferable that the arm has a U-shaped cross section in which one side in the axial direction is opened.

Thus, in the case where the pulley is an integrally molded product such as an aluminum die-cast or injection molding of resin, the pulley may be easily taken out from the mold after molding, thereby improving the productivity. By making the cross section U-shaped, the weight may be reduced, and the section modulus increases, so that the rigidity may be structurally strengthened.

The resonance frequency of the pulley may be set to be larger than the upper limit value of the rotational frequency band of the motor at the time of dewatering.

Thus, since the resonance frequency of the pulley becomes a value far from the rotation frequency of the motor, it is possible to suppress the increase of the noise caused by the resonance.

According to a washing machine of the present invention, since the rigidity of a pulley can be improved while suppressing a weight of the pulley from increasing, excessive noises due to resonance can be reduced.

BRIEF DESCRIPTION OF THE DRAWINGS

FIG. 1 is a vertical sectional view of an internal structure of a washing machine according to an embodiment.

FIG. 2 is a schematic view of an internal structure of a washing machine viewed from the rear.

FIG. 3a is a schematic view of a drum pulley viewed from below.

FIG. 3b is a schematic cross-sectional view of FIG. 3a taken along the line X-X.

FIG. 4 is a schematic perspective view of a part of an arm.

FIG. 5 shows a primary resonance of a drum pulley.

FIG. 6 is a schematic perspective view of an arm according to a modified exemplary embodiment.

FIG. 7a is a schematic view showing a model (reference example) used in structural analysis of an arm.

FIG. 7b is a schematic view showing a model (embodiment) used in structural analysis of an arm.

FIG. 8 is a graph showing results of the hammering test. The solid line represents an embodiment, and the broken line represents a reference example.

FIG. 9 is a graph showing results of comparing the magnitude of noise (PWL) in the embodiment (solid line) and the reference example (broken line).

FIG. 10 is a graph showing a relationship between the ratio of the variable cross-sectional portion and the stiffness.

FIG. 11 is a graph showing a relationship between the amount of change in the height of the variable cross-sectional portion and the stiffness.

FIG. 12 is a graph showing a relationship between the amount of change in the thickness of the variable cross-sectional portion and the stiffness.

DETAILED DESCRIPTION

Hereinafter, embodiments of the present invention will be described in detail with reference to the accompanying drawings. However, the following description is merely exemplary in nature, and the present invention, its application, and its usage are not limited thereto.

A washing machine 1 to which the present invention is applied is shown in FIGS. 1 and 2. The washing machine 1 is a horizontal drum type full automatic washing machine, and is configured to be capable of performing a series of processes from washing to rinsing and dehydration by only inserting laundry into a drum 9 and operating a button or the like to give an instruction to the washing machine 1.

In a front surface of a case 2 of the washing machine 1 having a box shape, an entrance 4 through which laundry is inserted and removed by opening and closing a door 3 is provided. Inside the case 2, a water tub 5 in a cylindrical shape having a bottom is laterally installed. In detail, the water tub 5 is installed inside the case 2 in a state in which an opening of the water tub 5 faces a frontward direction, so that a central line C extends in frontward and rearward directions. The opening is connected to the entrance 4 through a flexible connection member 6.

The water tub 5 is elastically supported by the case 2 in a vertical direction. Specifically, the water tub 5 is suspended by a plurality of coil springs 7 installed in an inner upper portion of the case 2, and is supported by a plurality of dampers 8 installed in an inner lower portion of the case 2. Further, the drum 9 in a cylindrical shape in a size one level smaller than that of the water tub 5 and having a bottom is accommodated inside the water tub 5.

Since a plurality of dehydration holes 9a are formed in an edge wall of the drum 9, water is drained outward from the drum 9 through the dehydration holes 9a during dehydration. Further, agitating protrusions 9b configured to agitate water or laundry accommodated inside the drum 9 due to rotation of the drum 9 during washing or rinsing are formed on a plurality of locations in an inner surface of the edge wall of the drum 9. Like the water tub 5, in a state in which an opening of the drum 9 faces a frontward direction, the drum 9 is installed inside the water tub 5 so that a center thereof coincides with the central line C of the water tub 5, and thus the drum 9 is configured to be rotatable around the central line C.

In detail, a shaft 9c configured to protrude along the central line C is formed at a center of an outer surface of a lower wall of the drum 9, and the shaft 9c is rotatably supported by a bearing 10 installed at a center of a lower wall of the water tub 5. A protruding end portion of the shaft 9c protrudes outward from the water tub 5, and a pulley (also referred to as a drum pulley 20) including an outer wheel 21, a boss 22, six arms 23, and the like is integrally mounted on the protruding end portion. That is, since the drum pulley 20 is directly mounted on the drum 9, the drum 9 and the drum pulley 20 are rotated at the same rotational speed. Further, the number of arms 23 is only one example, and may be appropriately selected among three, seven, or the like according to design of the drum pulley 20.

In a state in which a location of a driving shaft 11a is determined so that the driving shaft 11a becomes parallel with the central line C, a motor 11 is installed at a lower portion of the water tub 5. The driving shaft 11a of the motor 11 protrudes rearward from the lower wall of the water tub 5, and a driving pulley 12 having a small diameter is fixed to a protruding end portion. Since a belt (also referred to as an endless belt 13) is fitted onto the driving pulley 12 and the drum pulley 20 in a tensioned state, the drum 9 and the drum pulley 20 are rotationally driven by the motor 11 through the endless belt 13.

Although the drum 9 is rotated at low speed during the washing or the rinsing, the drum 9 needs to be rotated at high speed during the dehydration using a centrifugal force. Accordingly, the motor 11 is provided to be controllable at a rotation frequency band from 200 Hz (12000 RPM) to 300 Hz (18000 RPM) during the dehydration, and in the case of the washing machine 1, the motor 11 is provided to rotate at approximately 255 Hz during the dehydration.

In the case of a method of driving a pulley deceleration type belt, to obtain high torque needed during the washing or the rinsing, an external diameter of the drum pulley 20 is relatively large. Accordingly, in consideration of both weight reduction and high rigidity, a pulley in a shape in which the plurality of arms 23 support the outer wheel 21 is used for the drum pulley 20.

FIGS. 3A and 3B show the drum pulley 20 in detail. The drum pulley 20 is a product integrally molded by aluminum die casting, injection molding of a resin, or the like. The outer wheel 21 is a part in a circular ring shape like a rolled long and thin band shaped plate, a width Wp of an axial direction thereof is set from 15 mm to 40 mm, and an external diameter Rp thereof is set from 200 mm to 450 mm. In the case of the drum pulley 20 of the embodiment, the former Wp is set to 21 mm, and the latter Rp is set to 297 mm. Since an outer circumferential surface of the outer wheel 21 is a flat surface, the endless belt 13 is fitted onto the outer wheel 21 to be in close contact with the outer wheel 21.

The boss 22 is a cylindrical shaped part located at a center of the outer wheel 21, and a shaft hole 22a on which a serration process or a D-cut is performed is formed at a center of the boss 22. The boss 22 is inserted into the shaft hole 22a, and thus the protruding end portion of the shaft 9c is fixed to the boss 22 to be integrated. An external diameter Rb of the boss 22 is set from 30 mm to 100 mm, and a height Hb of an axial direction of the boss 22 is set from 15 mm to 50 mm. In the case of the drum pulley 20 of the embodiment, the former Rb is set to 34 mm, and the latter Hb is set to 20 mm.

The arms 23 radially extend from an outer circumferential surface of the boss 22, and a front end of each of the arms 23 is integrally connected to an inner circumferential surface of the outer wheel 21. Each of the arms 23 is in a long and thin shape having a U shape cross-section, and has a long groove 23a opened along the arm 23 at one side in an axial direction thereof. As described above, by providing the cross-section of each of the arms 23 in a shape of which one side portion in an axial direction is spread and opened toward an end of the cross-section, since the arms 23 may be injection-molded and easily removed from a mold, productivity is improved. Further, by providing the cross-section in the U shape, since the arms 23 are lightened and a section modulus of each of the arms 23 increases, the rigidity of the arms 23 is structurally improved.

Further, in the drum pulley 20, the shape of each of the arms 23 is devised so as to reduce excessive noises due to resonance while suppressing a weight of the drum pulley 20 from increasing.

That is, as shown in FIG. 4, a variable cross-sectional portion 24 of which a section modulus against bending in an axial direction gradually decreases from the boss 22 to the outer wheel 21 is formed in a portion of each of the arms 23 adjacent to the outer wheel 21. Particularly, in the case of the embodiment, a width Wa, a shape of a cross-section, and a thickness t are approximately uniform in the entire portion of the arm 23, and the section modulus of the variable cross-sectional portion 24 is set by gradually decreasing only a height Ha in the axial direction.

Although the variable cross-sectional portion 24 may be formed in the entire portion of the arm 23, in the case of the embodiment, a uniform cross-sectional portion 25 of which a height Ha in the axial direction is approximately uniform and a section modulus is also uniform is formed in an area of a base end side (a portion close to the boss 22) of each of the arms 23. Since the variable cross-sectional portion 24 is formed in each of the arms 23, the rigidity of each of the arms 23 against bending in the axial direction may be improved, and thus, a resonance frequency of the drum pulley 20 may be increased while suppressing a weight of each of the arms 23 from increasing.

That is, in the drum pulley 20, since the outer wheel 21 and a periphery of the outer wheel 21 have high rigidity and are configured to be supported by the plurality of arms 23, when the drum pulley 20 resonates (primarily resonates), as shown in FIG. 5, the outer wheel 21 may usually be in a state in which each of the arms 23 is deformed to be bent in the axial direction (a primary resonance mode), while maintaining the shape thereof.

In this case, since relatively strong bending stress acts in a side portion of the boss 22 of each of the arms 23, the deformation of the arms 23 is efficiently suppressed by improving the rigidity of the side portion against bending in the axial direction, and thus a resonance frequency in the primary resonance mode may be increased. Further, the rigidity of each of the arms 23 against bending in the axial direction may be improved while suppressing the increase in weight of each of the arms 23 by forming the variable cross-sectional portion 24 in the portion of each of the arms 23 adjacent to the outer wheel 21 (details will be described below).

In the case of the washing machine 1, since a maximum rotation frequency of the motor 11 is 300 Hz during the dehydration, a primary resonance frequency of the drum pulley 20 is set to be greater than 300 Hz. Accordingly, since the primary resonance frequency of the drum pulley 20 becomes significantly different from the rotation frequency of the motor 11 during the dehydration, noises due to resonance are suppressed from increasing.

Modification of the Arms

In a variable cross-sectional portion 24, since a section modulus against bending in an axial direction only needs to gradually decrease from a boss 22 to an outer wheel 21, a shape of a cross-section of the variable cross-sectional portion 24 is not limited to a U shape. For example, the cross-section of the variable cross-sectional portion 24 may also be an I shape, a T shape, a quadrangular frame shape, a ring shape, etc.

Further, as shown in FIG. 6, a height, a width Wa, and a shape of a cross-section of the variable cross-sectional portion 24 are approximately uniform in the entire portion of the arm 23, and the section modulus of the variable cross-sectional portion 24 may be set (to<ti) by gradually decreasing only a thickness t of the variable cross-sectional portion 24. The section modulus of the variable cross-sectional portion 24 may be set by gradually decreasing both the height and the thickness of the variable cross-sectional portion 24.

First Embodiment

When designing a drum pulley 20, an analysis for a structure of an arm 23 was performed by a finite element method (FEM). A model used in the analysis is shown in FIGS. 7A and 7B. FIG. 7A shows a conventional model (a reference example model M1), and FIG. 7B shows a model to which an embodiment of the present invention is applied (an embodiment model M2).

The reference example model M1 was provided to have a shape having a cross-section uniform from a base end (a portion connected to a boss 22) of the arm 23 to a front end (a portion connected to an outer wheel 21) of the arm 23, and the embodiment model M2 was provided to have a shape having a uniform cross-sectional portion 25 in a base end side of the arm 23, and a variable cross-sectional portion 24 in a front end side of the arm 23. A boundary between the uniform cross-sectional portion 25 and the variable cross-sectional portion 24 was provided to be 30 mm apart from the base end of the arm 23.

In this analysis, assuming a primary resonance mode, in a state in which the base end of the arm 23 is fixed, as shown by an arrow, a load of 100N (static load) was applied to the front end of the arm 23. In both the reference example model M1 and the embodiment model M2, the same weight (21 g), the same maximum width (17 mm), and the same length (100 mm) are set, under the above-described conditions, an optimum state, in which a displacement amount of the front end of the arm 23 becomes minimized, was obtained, and displacement amounts of both models are compared in the case of the optimum state.

In the embodiment model M2 in the optimum state, although a height of the front end of the arm 23 became lower than that of the reference example model M1, and thus the section modulus of the variable cross-sectional portion 24 against bending in an axial direction decreased, a height of the uniform cross-sectional portion 25, and a height of an end portion of the variable cross-sectional portion 24 located at the boss 22 (an end portion 24a adjacent to the boss), became higher than those of the reference example model M1, and thus the section modulus of the uniform cross-sectional portion 25 against bending in an axial direction increased.

In the optimum state, since the displacement amount of the embodiment model M2 decreased to approximately 50% of the displacement amount of the reference example model M1, the rigidity of the embodiment model M2 in an axial direction was found to be improvable without a shape thereof being deformed, which accompanies an increase of the weight.

A hammering test using two trial manufactured pulleys (a reference example pulley and an embodiment pulley) having the same weight on the basis of the reference example model M1 and the embodiment model M2 in the optimum state, was performed, and resonance frequencies of both the reference example model M1 and the embodiment model M2 were compared. A result of the test is shown in FIG. 8.

In FIG. 8, a solid line shows the resonance frequency of the embodiment pulley, and a dashed line shows the resonance frequency of reference example pulley. The vibrations detected front and rear elements of the axial direction. As shown by an arrow in FIG. 8, a primary resonance frequency of the reference example pulley was 234 Hz, whereas a primary resonance frequency of the embodiment pulley was 329 Hz, that is, the primary resonance frequency of the embodiment pulley can be seen to more greatly increase than the primary resonance frequency of the reference example pulley.

Although the primary resonance frequency of the reference example pulley is in a rotation frequency band of a motor 11 during dehydration and set to a value close to a rotation frequency (approximately 255 Hz) of the motor 11, since the primary resonance frequency of the embodiment pulley is apart from the rotation frequency band of the motor 11 during the dehydration and set to a value significantly different from the rotation frequency of the motor 11 during the dehydration, noises due to resonance can be suppressed from increasing.

In FIG. 9, a result, in which sound power levels (PWL) around the rotation frequency band of the motor 11 are compared, is shown. A dashed line shows the PWL of the reference example pulley, and a solid line shows the PWL of the embodiment pulley. Referring to the PWL around the rotation frequency band of the motor 11, the PWL of the embodiment pulley is relatively lower compared to the PWL of the reference example pulley of the reference example model M1, and thus the noises due to the resonance can be seen to be reduced in the embodiment pulley. In a body noise test, a noise reduction effect of approximately 0.5 dBA was found to be obtained Second Embodiment In an analysis for the embodiment model M2, a relation between a proportion and rigidity of the variable cross-sectional portion 24 of the arm 23 was investigated. Specifically, a weight, a maximum width, and a length were the same as those in the first embodiment, and as shown in FIG. 3A, by varying a ratio Li/Lo (%) which is a ratio of a length Li from a center C to an end portion of the variable cross-sectional portion 24 located at the boss 22 (an end portion 24a adjacent to the boss), with respect to a length Lo from the center C to a periphery of the outer wheel 21, an optimum state in which a displacement amount of a front end of the arm 23 is minimized at each of the varied ratios Li/Lo was obtained. A result is shown in FIG. 10. Further, a vertical axis shows a displacement amount reduction rate of the front end (% with respect to the reference example model M1).

A displacement amount reduction effect was further found when the ratio Li/Lo became smaller (the uniform cross-sectional portion 25 became shorter and the variable cross-sectional portion 24 became longer), and the displacement amount reduction effect gradually decreased when the ratio Li/Lo became greater, and accordingly, the reduction effect was not found when the ratio Li/Lo became 90%. From the above-described result, since a stable displacement amount reduction effect is obtained by setting the ratio Li/Lo to lower than or equal to 80%, noises due to resonance can be seen to be suppressed from increasing.

Third Embodiment

Further, the influence on rigidity of the variable cross-sectional portion 24 according to a change amount of a height of the variable cross-sectional portion 24 was also investigated. Under conditions the same as the conditions in the second embodiment, at ratios Li/Lo of the variable cross-sectional portion 24 (30%, 50%, 70%), as shown in FIG. 7B, by varying a ratio Ho/Hi, which is a ratio of a height Ho of an end portion of the variable cross-sectional portion 24 located at the outer wheel 21 (an end portion 24b adjacent to an outer wheel), with respect to a height Hi of an end portion 24a adjacent to the boss, to greater than or equal to 30%, an optimum state in which a displacement amount of a front end of the arm 23 is minimized at each of the ratios Ho/Hi was obtained. A result is shown in FIG. 11. Further, like the second embodiment, a vertical axis shows a displacement amount reduction rate of the front end (% with respect to the reference example model M1).

A displacement amount reduction effect was further found when the ratio Ho/Hi became smaller (the change amount of the height of the variable cross-sectional portion 24 increased), and the displacement amount reduction effect gradually decreased when the ratio Ho/Hi became greater. From the above-described result, although the ratio Li/Lo of the variable cross-sectional portion 24 was 80%, since a stable displacement amount reduction effect is obtained by setting the ratio Ho/Hi from at least 30% to 70%, noises due to resonance can be seen to be suppressed from increasing.

Fourth Embodiment

As shown in FIG. 6, an effect occurring when a section modulus of the variable cross-sectional portion 24 is set by gradually decreasing a thickness of the variable cross-sectional portion 24, was also investigated. A weight, a maximum width, and a length of the arm 23 were the same as those in the first embodiment, and in this analysis, the uniform cross-sectional portion 25 was not formed and a thickness of a cross-section of the arm 23 was set to be uniformly change and gradually decrease from a base end of the arm 23 to a front end of the arm 23 so that the entire portion of the arm 23 became the variable cross-sectional portion 24. By varying a ratio to/ti, which is a ratio of a thickness of an end portion 24b of the arm 23 adjacent to an outer wheel, with respect to a thickness ti of an end portion 24a of the arm 23 (the variable cross-sectional portion 24) adjacent to the boss, to greater than or equal to 30%, an optimum state in which a displacement amount of the front end of the arm 23 is minimized at each of the ratios to/ti was obtained. A result is shown in FIG. 12. Further, a vertical axis shows a displacement amount reduction rate of the front end (% with respect to the reference example model M1).

A displacement amount reduction effect was further found when the ratio to/ti became smaller (a change amount of the height of the arm 23 increased), and the displacement amount reduction effect gradually decreased when the ratio Ho/Hi became greater. From the above-described result, since a stable displacement amount reduction effect is obtained by setting the ratio to/ti from at least 30% to 50%, noises due to resonance can be seen to be suppressed from increasing.

The invention claimed is:

1. A washing machine comprising:
a drum rotatably disposed in the washing machine;
a pulley including a boss to which a shaft of the drum is fixed, an outer wheel centered on the boss, and an arm configured to radially extend, along a radial axis of the boss, from the boss to support the outer wheel,
the arm having a variable cross-sectional portion having a curved shape of which a size of a cross-section, in a plane perpendicular to the radial axis, varies,
wherein the arm includes a groove opened along the arm at one side in a direction toward the drum and a depth of the groove gradually decreases in a radial direction from the boss to the outer wheel; and
a motor connected to the pulley through a belt to rotationally drive the pulley.

2. The washing machine of claim 1, wherein:
the arm includes a uniform cross-sectional portion of which a size of a cross-section is uniform along the radial axis; and
the variable cross-sectional portion is formed at a portion adjacent to the outer wheel of the arm.

3. The washing machine of claim 1, wherein in the arm, a height, of the cross-section through the variable cross-sectional portion in an axial direction of the shaft increases from an outer wheel-side end portion to a boss-side end portion.

4. The washing machine of claim 3, wherein a shape of the cross-section of the arm, and a width and a thickness of the arm perpendicular to the axial direction of the shaft are formed to be uniform.

5. The washing machine of claim 3, wherein in the variable cross-sectional portion, a height, in the axial direction of the shaft, of a cross-section of the outer wheel-side end portion is formed to be 30% to 70% of a height, in the axial direction of the shaft, of a cross-section of the boss-side end portion.

6. The washing machine of claim 1, wherein a length from a center of the outer wheel to a boss-side end portion of the variable cross-sectional portion of the arm is formed to be less than or equal to 80% of a radius of the outer wheel.

7. The washing machine of claim 1, wherein a thickness of the cross-section through the variable cross-sectional portion increases from an outer wheel-side end portion to a boss-side end portion.

8. The washing machine of claim 7, wherein in the arm, a shape of the cross-section of the arm, a height of the arm in an axial direction of the shaft, and a width of the arm in a perpendicular direction to the axial direction of the shaft are formed to be uniform.

9. The washing machine of claim 7, wherein, in the variable cross-sectional portion, a thickness of a cross-section of the outer wheel-side end portion is formed to be 30% to 50% of a thickness of a cross-section of the boss-side end portion.

10. The washing machine of claim 7, wherein a height of the cross-section through the variable cross-sectional portion in an axial direction of the shaft increases from the outer wheel-side end portion to the boss-side end portion.

11. The washing machine of claim 1, wherein the cross-section of the arm has one shape among a U shape, an I shape, a T shape, a quadrangular frame shape, and a ring shape.

12. The washing machine of claim 1, wherein the pulley has a resonance frequency greater than a maximum value of a rotation frequency of the motor during dehydration.

* * * * *